United States Patent
Strang et al.

[11] Patent Number: 6,058,715
[45] Date of Patent: May 9, 2000

[54] ENVIRONMENTAL CONTROL SYSTEM INCLUDING AIR CYCLE MACHINE AND ELECTRICAL MACHINE

[75] Inventors: James E. Strang, Fountain Valley; Kim E. Linnett, Palos Verdes Estates; Dan Matulich, Rolling Hills Estates, all of Calif.

[73] Assignee: AlliedSignal Inc., Morristown, N.J.

[21] Appl. No.: 08/987,737

[22] Filed: Dec. 9, 1997

[51] Int. Cl.[7] ................................................ F25B 9/06
[52] U.S. Cl. .................................. 62/87; 62/172; 62/402
[58] Field of Search ........................ 62/87, 172, 402, 62/401, 86, 88, DIG. 5; 454/71, 74, 75

[56] References Cited

U.S. PATENT DOCUMENTS

| | | | |
|---|---|---|---|
| 3,024,624 | 3/1962 | Morley et al. | 62/402 |
| 3,878,692 | 4/1975 | Steves | 62/87 |
| 4,494,372 | 1/1985 | Cronin | 60/39.07 |
| 4,684,081 | 8/1987 | Cronin | 454/71 X |
| 5,114,103 | 5/1992 | Coffinberry | 62/DIG. 5 |
| 5,143,329 | 9/1992 | Coffinberry | 454/71 X |
| 5,442,905 | 8/1995 | Claeys et al. | 454/71 X |
| 5,887,445 | 3/1999 | Murry et al. | 62/402 |

*Primary Examiner*—Harry B. Tanner
*Attorney, Agent, or Firm*—William J. Zak, Jr., Esq.

[57] ABSTRACT

An environmental control system includes an air cycle machine, an electrical machine coupled to the air cycle machine, and a controller for the electrical machine. The controller can cause electrical energy to be extracted from the electrical machine whenever cooling capacity and/or airflow rate of the air cycle machine are greater than necessary. The electrical machine can also be operated as a motor to increase the airflow rate and cooling capacity of the air cycle machine.

19 Claims, 2 Drawing Sheets

ENVIRONMENTAL CONTROL SYSTEM INCLUDING AIR CYCLE MACHINE AND ELECTRICAL MACHINE

BACKGROUND OF THE INVENTION

The invention relates to environmental control systems. More specifically, the invention relates to an environmental control system including an air cycle machine and an electrical machine.

An air conditioning system for an aircraft is designed to control airflow into the aircraft's passenger cabin as well as air temperature inside the passenger cabin. Most aircraft air conditioning systems operate on an air cycle refrigeration principle. Compressed air is obtained from an intermediate compressor stage of the aircraft's main engine, cooled with ambient air to near-ambient temperature in an air-to-air heat exchanger and then expanded in an air cycle machine to provide a stream of cooled, conditioned air. The conditioned air is supplied to the passenger cabin. Although somewhat expanded, the conditioned air is still compressed in order to pressurize the passenger cabin.

On occasion, the conditioned air might provide more cooling than necessary. The aircraft might climb to a high altitude, or the ambient air might be very cold. Whenever the conditioned air provides more cooling than necessary, the cooling is reduced by a complex combination of valves and controls.

Additionally, the engine supply pressure might sometimes be greater than required. Whenever this occurs, the pressure is reduced by throttling the compressed air. Throttling could be performed by modulating a bleed air pressure regulator valve, a pack flow control valve, or a bypass valve for the air cycle machine. However, throttling is a wasteful process that causes engine fuel consumption to be greater than necessary.

SUMMARY OF THE INVENTION

An environmental control system comprises an air cycle machine; an electrical machine coupled to a shaft of the air cycle machine; and a controller. The electrical machine transfers a load to the air cycle machine while electrical energy is being extracted from the electrical machine. The controller controls an amount of electrical energy extracted from the electrical machine, whereby cooling capacity and airflow rate of the air cycle machine are controlled by controlling the load on the electrical machine.

DETAILED DESCRIPTION OF THE INVENTION

Figure 1:
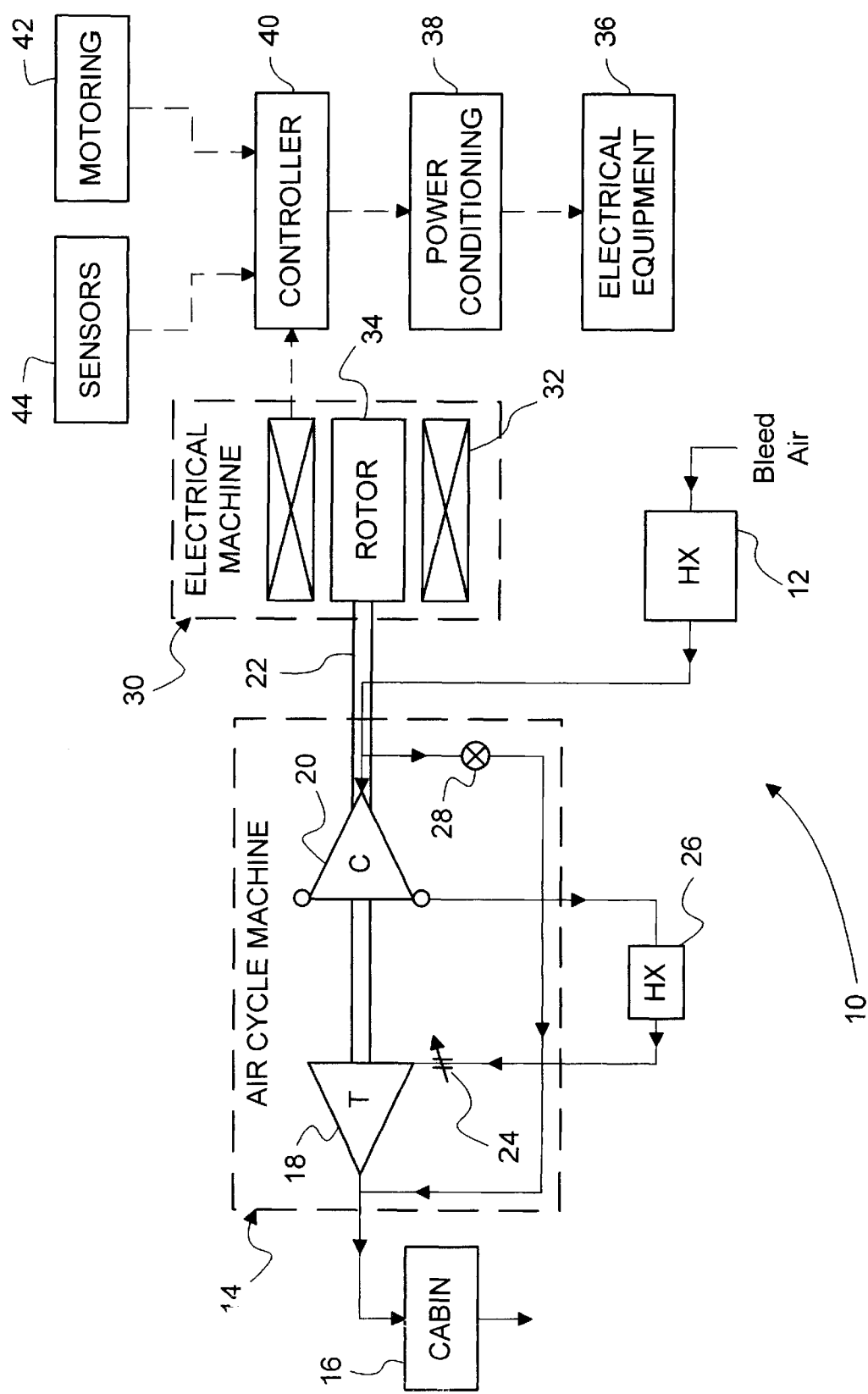
FIG. 1 is a schematic diagram of an environmental control system according to the present invention.

FIG. 1 shows an environmental control system (ECS) 10 for an aircraft. Bleed air from a compressor stage of an aircraft engine or an auxiliary power unit is cooled by an air-to-air heat exchanger 12 and expanded by an air cycle machine 14. Moisture is removed from the bleed air to provide a stream of cooled, conditioned air to an aircraft cabin 16. Excess air in the cabin 16 is dumped overboard.

The air cycle machine 14 can perform expansion in any number of ways. The air cycle machine 14 can use an open-loop refrigeration cycle such as a simple cycle, two-wheel bootstrap cycle, three-wheel bootstrap cycle or four-wheel bootstrap cycle to expand the bleed air. For example, the air cycle machine 14 can have the two-wheel design shown in FIG. 1. The two-wheel design is shown merely to facilitate an understanding of the invention. A compressor 18 and a cooling turbine 20 are mounted to a shaft 22. The turbine 20 has a variable geometry inlet nozzle 24, which optimizes airflow and power extraction. The area of the nozzle 24 is adjustable to control the flow of cooled, conditioned air into the cabin 16 as the cabin pressure and engine pressure change. The nozzle area increases when the aircraft cabin 16 requires more fresh air and decreases when the aircraft cabin 16 requires less fresh air.

The ECS 10 can perform moisture removal in any number of ways. The ECS 10 can use high pressure water separation equipment (e.g., reheater, condenser and water extractor) or low pressure water separation equipment to remove the moisture from the bleed air.

The ECS 10 further includes a heat exchanger 26, a bypass valve 28 and an electrical machine 30. The heat exchanger 26 removes heat from compression. The bypass valve 28 can be regulated to provide additional heat and air to the aircraft cabin 16 and, thereby, optimize temperature and flow control to the aircraft cabin 16.

The electrical machine 30 includes a stator 32 and a rotor 34 that is coupled to the shaft 22 of the air cycle machine 14. The electrical machine 30 can be a permanent magnet machine having a permanent magnet rotor and stator windings. If the rotor 34 can be operated at shaft speed, it can be mounted directly to the shaft 22, without the need for a gearbox. In the alternative, the rotor 34 can be mounted to a separate shaft, which is coupled to the shaft 22 of the air cycle machine 12 by a gearbox or magnetic coupler. The gearbox allows the electrical machine 30 to be operated at reduced speeds.

The air cycle machine 14 generates shaft power when the bleed air is expanded. The shaft 22 of the air cycle machine 10 transmits the shaft power to the electrical machine 30.

When the shaft 22 drives the rotor 34, an electrical current is induced in the stator 32. Because the air cycle machine 12 is operated at varying speeds, the electrical machine 30 provides ac output voltage having variable frequency.

Electrical energy is extracted from the electrical machine 30 and utilized by other electrical equipment 36 such as motors and heaters. A power conditioning circuit 38 is provided for electrical equipment 36 that cannot be operated at wild ac frequencies. A power conditioning circuit 38 for ac electrical equipment might include an ac-to-ac converter for converting the variable frequency ac voltage to a dc voltage, and chop the dc voltage to provide a constant frequency ac voltage. A power conditioning circuit 38 for dc electrical equipment might include a rectifier for converting the variable frequency ac voltage to a dc voltage.

Extracting the electrical energy from the electrical machine 30 causes a load to be placed on the electrical machine 30. The load is transmitted to the air cycle machine 14 via the shaft 22. As the amount of energy extracted from the electrical machine 30 is increased, the load on the air cycle machine 14 is increased. Consequently, shaft speed is slowed, thereby decreasing the cooling capacity of the air cycle machine 14 and decreasing the airflow rate of conditioned air flowing out of the air cycle machine 14. Varying the amount of energy extracted from the electrical machine 30 varies cooling capacity and airflow rate of the air cycle machine 14.

A controller 40 controls the amount of electrical energy that the power conditioning circuit 38 extracts from the electrical machine 30. When the controller 40 determines that cooling capacity and airflow rate should be reduced, the controller 40 can cause electrical energy to be extracted from the electrical machine 30. Once the cooling capacity and airflow rate reach a desired level, the controller 40 stops the electrical energy from being extracted.

When the flow of bleed air to the air cycle machine 14 should be reduced, the controller 40 can cause the electrical machine 30 to be loaded. Loading the electrical machine 30 reduces the amount of bleed air supplied to the air cycle machine 14. Thus eliminated is the need for a flow control valve for the ECS 10.

The controller 40 can also cause the electrical machine 30 to be operated as a motor. Operating the electrical machine 30 as a motor increases the shaft speed and, therefore, the cooling capacity and airflow rate of the air cycle machine 14. When additional cooling is needed, the controller 40 connects motoring apparatus 42 to the stator 32. The motoring apparatus 42, which includes commutation logic and an inverter, applies an excitation to the stator 32, causing the rotor 34 to rotate faster and additional bleed air to be supplied to the air cycle machine 14.

The electrical machine 30 can be operated as a motor during descent of the aircraft, when less air is available for the cabin 16. Operating the electrical machine 30 as a motor would cause additional air to be pumped into the cabin 16.

The controller 40 controls the cooling capacity and airflow rate in response to sensor signals indicating parameters such as avionics temperature, temperature of the air leaving the air cycle machine 14, rate of air flowing into the aircraft cabin 16, rate of air flowing out of the cabin 16, temperature of the cabin 16, etc. The sensor signals could be provided by a sensor group 44 or by sensors already on board the aircraft. The number and type of sensor signals generated by the sensor group 32 and the controller algorithm for processing the signals are application-specific.

Figure 2:
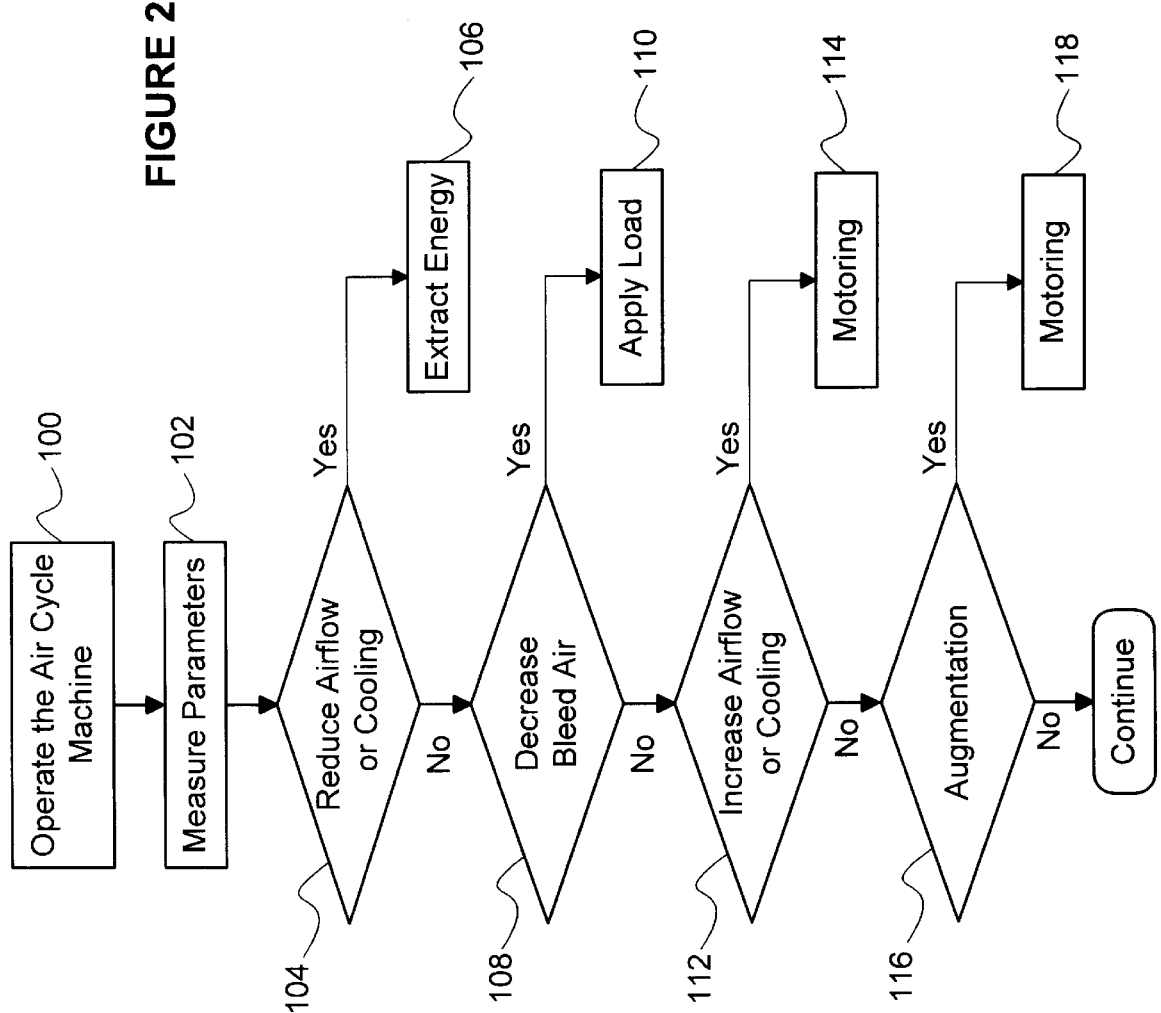
FIG. 2 is a flowchart of a method of controlling an electrical machine, which forms a part of the environmental control system.

FIG. 2 shows a method of operating the ECS 10. Bleed air is supplied to the air cycle machine 14 (step 100), and sensor signals are generated and supplied to the controller 40 (step 102). When cooling capacity and airflow rate are greater than necessary (step 104), electrical energy is extracted from the electrical machine 14 (step 106). When the flow of bleed air is too high (step 108), the electrical machine 30 is loaded, reducing the flow of bleed air to the air cycle machine 14 (step 110). When the cooling capacity or airflow rate are insufficient (step 112), the electrical machine 30 is operated as a motor (step 114), increasing the flow of bleed air to the air cycle machine 14. These extraction and motoring functions can be controlled automatically by the controller 40 and/or commanded from the aircraft.

In certain situations when augmentation is required (step 116), the electrical machine 30 is automatically operated as a motor (step 118). One such situation might occur during descent of the aircraft, when less air available for the cabin 16. Operating the electrical machine 30 as a motor during descent causes additional air to be supplied by the air cycle machine 14 to the cabin 16. Another situation requiring augmentation might occur while the aircraft is on the ground.

Thus disclosed is an ECS 10 which provides a stream of cooled, conditioned air without wasting fuel due to throttling and without using a complex combination of valves and controls for reducing the amount of cooling. Unused fluid power in the air cycle machine 14 is converted into electrical energy.

The ECS 10 can be applied to many types of aircraft (e.g., fighters, bombers, cargo planes, helicopters) and systems other than aircraft. For example, an ECS 10 for a ground-based or stationary system could receive pressurized air from a turbogenerator. The pressurized air would be supplied to a heat exchanger, and a fan would circulate ambient air over the heat exchanger. The cooled air would then be supplied to the air cycle machine 14.

Modifications can be made without departing from the spirit and scope of the invention. For example, the electrical machine 30 could be a ring wound machine or inductance machine instead of a permanent magnet machine. These considerations, and other considerations including the design of the air cycle machine 14 and the controller 40, are all dependent upon the application for which the ECS 10 is intended.

We claim:

1. An environmental control system comprising:

an air cycle machine;

an electrical machine coupled to a shaft of the air cycle machine, whereby the electrical machine transfers a load to the air cycle machine while electrical energy is being extracted from the electrical machine; and a controller for controlling an amount of electrical energy extracted from the electrical machine to regulate cooling capacity of the air cycle machine;

whereby cooling capacity of the air cycle machine is controlled by controlling the load on the electrical machine.

2. The system of claim 1, further comprising means for extracting the electrical energy from the electrical machine.

3. The system of claim 1, wherein the controller can cause the electrical energy to be extracted in order to regulate airflow rate of the air cycle machine.

4. The system of claim 1, wherein the controller can regulate the flow of bleed air to the air cycle machine by loading the electrical machine.

5. The system of claim 1, further comprising motoring apparatus, responsive to the controller, for operating the electrical machine as a motor when additional airflow is needed.

6. The system of claim 1, further comprising motoring apparatus, responsive to the controller, for operating the electrical machine as a motor when additional cooling is needed.

7. The system of claim 1, further comprising motoring apparatus, responsive to the controller, for automatically operating the electrical machine as a motor when augmentation is needed.

8. The system of claim 1, wherein the controller controls the amount of electrical energy extracted from the electrical machine in response to at least one parameter.

9. The system of claim 1, wherein the air cycle machine includes a turbine having a variable geometry inlet nozzle.

10. An environmental control system for providing cooled, conditioned air to an aircraft passenger cabin, the system comprising:

an air cycle machine including a shaft;

an electrical machine coupled to the shaft of the air cycle machine, whereby the electrical machine transfers a load to the air cycle machine when electrical energy is extracted from the electrical machine; and a controller, responsive to at least one sensor signal, for controlling an amount of electrical energy extracted from the electrical machine to control airflow rate of the air cycle machine;

whereby airflow rate is regulated by controlling the load on the electrical machine.

11. The system of claim 10, wherein the controller can automatically cause the electrical machine to operate as a motor when augmentation is needed.

12. The system of claim 10, wherein the controller can control the amount of electrical energy extracted from the electrical machine to regulate cooling capacity of the air cycle machine.

13. The system of claim 10, wherein the controller can load the electrical machine to reduce the flow of bleed air to the air cycle machine.

14. The system of claim 10, wherein the controller can control the amount of electrical energy extracted from the electrical machine in response to at least one parameter.

15. A method of operating an environmental control system including an air cycle machine and an electrical machine coupled to the air cycle machine, the method comprising the steps of:

operating the air cycle machine;

measuring a parameter for the environmental control system; and extracting electrical energy from the electrical machine in response to the measured parameter to control at least one of cooling capacity and airflow rate of the air cycle machine at desired levels, whereby a load is placed on the electrical machine while energy is being extracted from the electrical machine.

16. The method of claim 15, further comprising the step of operating the electrical machine as a motor when the measured parameter indicates that additional cooling is necessary.

17. The method of claim 15, further comprising the steps of measuring an airflow rate; and operating the electrical machine as a motor when the measured airflow rate indicates that additional airflow is necessary.

18. The method of claim 15, further comprising the step of loading the electrical machine to regulate the flow of bleed air to the air cycle machine.

19. The method of claim 15, wherein the step of operating the air cycle machine includes expanding bleed air in a turbine, and wherein the method further comprises the step of varying turbine nozzle area to control the airflow rate of the air cycle machine.

* * * * *